US010108192B1

(12) United States Patent
LaForge et al.

(10) Patent No.: US 10,108,192 B1
(45) Date of Patent: *Oct. 23, 2018

(54) SYSTEM AND METHOD FOR DETERMINING POSE DATA FOR A VEHICLE

(71) Applicant: Waymo LLC, Mountain View, CA (US)

(72) Inventors: Seth Michael LaForge, Mountain View, CA (US); Craig Lewin Robinson, Palo Alto, CA (US); John Tisdale, Oakland, CA (US); Russell Smith, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,266

(22) Filed: Jan. 30, 2018

Related U.S. Application Data

(63) Continuation of application No. 15/054,441, filed on Feb. 26, 2016, now Pat. No. 9,915,947.

(51) Int. Cl.
  *G05D 1/00* (2006.01)
  *G05D 1/02* (2006.01)

(52) U.S. Cl.
  CPC ......... *G05D 1/0088* (2013.01); *G05D 1/0268* (2013.01); *G05D 1/0278* (2013.01); *G05D 2201/02* (2013.01)

(58) Field of Classification Search
  USPC .......... 701/23, 472, 41, 468, 300, 470, 301, 701/31.4, 494, 495, 510; 342/357.24, 342/357.2, 357.3, 357.31
  See application file for complete search history.

(56) References Cited

U.S. PATENT DOCUMENTS

| | | | | |
|---|---|---|---|---|
| 6,091,359 A | * | 7/2000 | Geier | G01C 21/20 342/357.31 |
| 7,313,404 B2 | * | 12/2007 | Anderson | G01C 21/28 455/456.1 |
| 8,787,943 B2 | * | 7/2014 | Ghinamo | G01S 19/20 342/357.24 |
| 8,909,471 B1 | * | 12/2014 | Jinkins | G01S 13/60 342/350 |
| 8,949,016 B1 | * | 2/2015 | Ferguson | B60W 30/00 340/436 |

(Continued)

FOREIGN PATENT DOCUMENTS

WO    2009118043 A1    10/2009

*Primary Examiner* — Richard A Goldman
(74) *Attorney, Agent, or Firm* — McDonnell Boehnen Hulbert & Berghoff LLP

(57) ABSTRACT

Example systems and methods are disclosed for determining vehicle pose data for an autonomous vehicle. The vehicle computer system may receive pose data from multiple pose measurement systems of the autonomous vehicle. Each pose measurement system may include one or more corresponding sensors of the autonomous vehicle. The vehicle computer system may determine a pose data quality for the received pose data for each pose measurement system. The vehicle computer system may set the vehicle pose data to the pose data of the pose measurement system with the highest pose data quality. The vehicle computer system may control the autonomous vehicle based on the vehicle pose data.

20 Claims, 7 Drawing Sheets

(56) References Cited

U.S. PATENT DOCUMENTS

| | | | |
|---|---|---|---|
| 9,201,424 B1 | 12/2015 | Ogale | |
| 9,481,977 B1* | 11/2016 | Clar | E02F 3/841 |
| 9,589,470 B2* | 3/2017 | Kuwabara | G08G 1/167 |
| 9,915,947 B1* | 3/2018 | LaForge | G05D 1/0088 |
| 2002/0193929 A1* | 12/2002 | Beck | A01B 69/008 |
| | | | 701/50 |
| 2005/0049787 A1* | 3/2005 | Cho, II | G01C 21/165 |
| | | | 701/472 |
| 2006/0080036 A1* | 4/2006 | Stefan | B60R 25/00 |
| | | | 701/300 |
| 2007/0280528 A1* | 12/2007 | Wellington | G05D 1/0274 |
| | | | 382/154 |
| 2009/0037107 A1* | 2/2009 | Huddle | G01C 21/16 |
| | | | 701/510 |
| 2009/0192666 A1* | 7/2009 | Trippler | G08G 1/163 |
| | | | 701/31.4 |
| 2009/0234523 A1* | 9/2009 | Nandedkar | B61L 25/021 |
| | | | 701/20 |
| 2010/0217455 A1* | 8/2010 | Stahlin | G01C 21/32 |
| | | | 701/1 |
| 2010/0220173 A1* | 9/2010 | Anguelov | H04N 5/23238 |
| | | | 348/36 |
| 2011/0054716 A1* | 3/2011 | Stahlin | G01C 21/28 |
| | | | 701/1 |
| 2011/0106450 A1* | 5/2011 | Toda | G01C 21/165 |
| | | | 701/472 |
| 2012/0101715 A1* | 4/2012 | Tangirala | G01C 21/005 |
| | | | 701/408 |
| 2012/0150437 A1* | 6/2012 | Zeng | B60W 30/12 |
| | | | 701/456 |
| 2013/0116921 A1* | 5/2013 | Kasargod | G01S 19/45 |
| | | | 701/472 |
| 2013/0325334 A1 | 12/2013 | Mian et al. | |
| 2014/0012499 A1* | 1/2014 | Hirose | G01C 21/28 |
| | | | 701/470 |
| 2014/0324300 A1* | 10/2014 | Halder | G01S 19/49 |
| | | | 701/50 |
| 2014/0371990 A1* | 12/2014 | Steinhardt | G01C 21/165 |
| | | | 701/41 |
| 2015/0073697 A1* | 3/2015 | Barrett | G01S 19/39 |
| | | | 701/409 |
| 2015/0293203 A1* | 10/2015 | Anderson | G01S 5/021 |
| | | | 701/518 |
| 2016/0180538 A1* | 6/2016 | Chen | G06T 19/20 |
| | | | 701/454 |

\* cited by examiner

| ROW # | POSE MEASUREMENT SYSTEM #1 POSE DATA QUALITY | POSE MEASUREMENT SYSTEM #2 POSE DATA QUALITY | VEHICLE POSE DATA | CONTROL OUTPUT |
|---|---|---|---|---|
| 1 | GOOD | GOOD | POSE DATA #1 | NORMAL |
| 2 | GOOD | MARGINAL | POSE DATA #1 | NORMAL |
| 3 | GOOD | BAD | POSE DATA #1 | NORMAL |
| 4 | MARGINAL | GOOD | POSE DATA #2 | NORMAL |
| 5 | MARGINAL | MARGINAL | POSE DATA #1 | PARK ASAP |
| 6 | MARGINAL | BAD | POSE DATA #1 | PARK ASAP |
| 7 | BAD | GOOD | POSE DATA #2 | NORMAL |
| 8 | BAD | MARGINAL | POSE DATA #2 | PARK ASAP |
| 9 | BAD | BAD | POSE DATA #1 | EMERGENCY BRAKE |

FIG. 3C

SYSTEM AND METHOD FOR DETERMINING POSE DATA FOR A VEHICLE

CROSS-REFERENCE TO RELATED APPLICATIONS

This application is a continuation of U.S. patent application Ser. No. 15/054,441, filed Feb. 26, 2016, which is incorporated herein by reference.

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses. Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

Example systems and methods may provide for determining vehicle pose data for an autonomous vehicle. The vehicle computer system of an autonomous vehicle may receive first pose data from a first pose measurement system and second pose data from a second pose measurement system. Each pose measurement system may have one or more corresponding sensors of the autonomous vehicle. The vehicle computer system may then determine a pose data quality for each received pose data. Pose data quality may be determined by crosschecking sensor data from the two pose measurement systems, using Kalman filters, and/or using other methods to grade the pose data quality as "good," "marginal," or "bad."

The vehicle pose data may be set to the first pose data quality when the first pose data is better than, or the same as, the second pose data quality. Alternatively, the vehicle pose data may be changed from the first pose data to the second pose data when the second pose data quality is better than the first pose data quality. Once the vehicle pose data is set, the vehicle computer system may control the autonomous vehicle based on the vehicle pose data. For example, the vehicle computer system may control the autonomous vehicle to stop within a predetermined period of time (such as 5 seconds, 15 seconds, 60 seconds, or some other amount of time) in response to the vehicle computer system not receiving vehicle pose data or receiving vehicle pose data with "bad" pose data quality.

In a first aspect, a method including receiving, at a vehicle computer system for an autonomous vehicle, first pose data for the autonomous vehicle from a first pose measurement system of the autonomous vehicle, wherein the first pose measurement system includes one or more corresponding sensors of the autonomous vehicle; receiving, at the vehicle computer system for the autonomous vehicle, second pose data for the autonomous vehicle from a second pose measurement system of the autonomous vehicle, wherein the second pose measurement system includes one or more corresponding sensors of the autonomous vehicle; determining a first pose data quality for the received first pose data and a second pose data quality for the received second pose data; setting the first pose data as vehicle pose data for the autonomous vehicle in response to the first pose data quality being better than or the same as the second pose data quality; and controlling, by the vehicle computer system, the autonomous vehicle based on at least the vehicle pose data.

In a second aspect, a non-transitory computer-readable medium storing instructions that are executable by one or more computing devices, where executing the instructions causes the one or more computing devices to perform functions including receiving, at a vehicle computer system for an autonomous vehicle, first pose data for the autonomous vehicle from a first pose measurement system of the autonomous vehicle, wherein the first pose measurement system includes one or more corresponding sensors of the autonomous vehicle; receiving, at the vehicle computer system for the autonomous vehicle, second pose data for the autonomous vehicle from a second pose measurement system of the autonomous vehicle, wherein the second pose measurement system includes one or more corresponding sensors of the autonomous vehicle; determining a first pose data quality for the received first pose data and a second pose data quality for the received second pose data; setting the first pose data as vehicle pose data for the autonomous vehicle in response to the first pose data quality being better than or the same as the second pose data quality; and controlling, by the vehicle computer system, the autonomous vehicle based on at least the vehicle pose data.

In a third aspect, a vehicle computer system for an autonomous vehicle including a processor and a memory storing instructions that when executed by the processor causes the vehicle computing system to perform functions including receiving first pose data for the autonomous vehicle from a first pose measurement system of the autonomous vehicle, wherein the first pose measurement system includes one or more corresponding sensors of the autonomous vehicle; receiving second pose data for the autonomous vehicle from a second pose measurement system of the autonomous vehicle, wherein the second pose measurement system includes one or more corresponding sensors of the autonomous vehicle; determining a first pose data quality for the received first pose data and a second pose data quality for the received second pose data; setting the first pose data as vehicle pose data for the autonomous vehicle in response to the first pose data quality being better than or the same as the second pose data quality; and controlling the autonomous vehicle based on at least the vehicle pose data.

In a fourth aspect, a system may include means for receiving, at a vehicle computer system for an autonomous vehicle, first pose data for the autonomous vehicle from a first pose measurement system of the autonomous vehicle, wherein the first pose measurement system includes one or more corresponding sensors of the autonomous vehicle. The system may also include means for receiving, at the vehicle computer system for the autonomous vehicle, second pose data for the autonomous vehicle from a second pose measurement system of the autonomous vehicle, wherein the second pose measurement system includes one or more corresponding sensors of the autonomous vehicle. The system may additionally include means for determining a first pose data quality for the received first pose data and a second pose data quality for the received second pose data. The system may also include means for setting the first pose data as vehicle pose data for the autonomous vehicle in response to the first pose data quality being better than or the same as the second pose data quality. The system may further include means for controlling, by the vehicle computer system, the autonomous vehicle based on at least the vehicle pose data.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 3C is a table indicating autonomous vehicle control based on pose data quality, according to an example embodiment.

DETAILED DESCRIPTION

Figure 1:
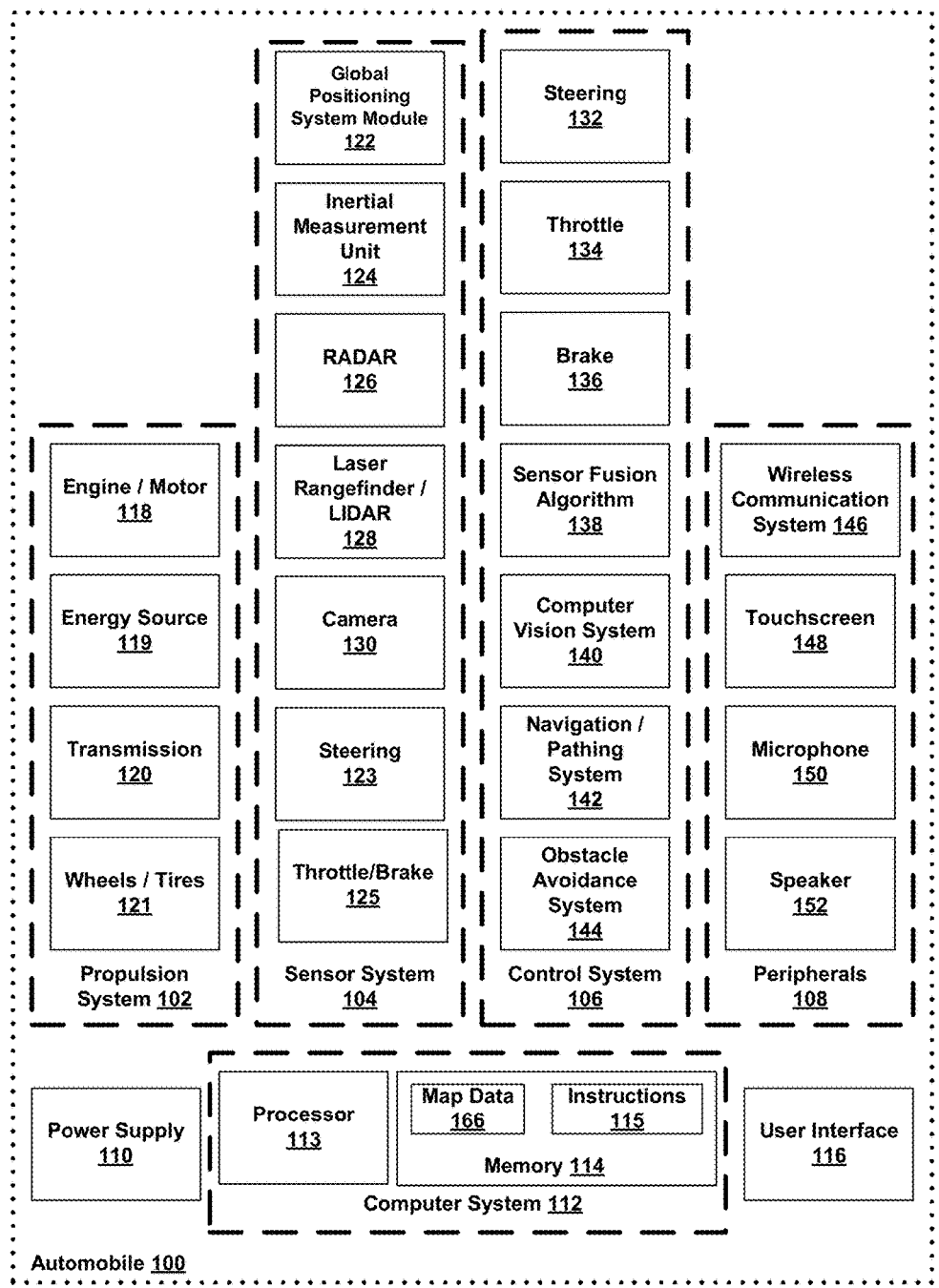
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Autonomous vehicles (e.g., self-driving cars) may provide safer and more efficient transportation than manually operated vehicles. In operation, autonomous vehicles may use data about their position, orientation, and velocity (collectively known as pose) relative to the world. Autonomous vehicles may receive pose data from a pose measurement system that includes various sensors (e.g., an inertial measurement unit, a GPS receiver, wheel speed sensors, etc.). Based on sensor data from these sensors, the autonomous vehicle can determine its pose relative to the world.

Efficient and safe transportation of an autonomous vehicle based on pose data may occasionally present challenges. There may be various potential causes of pose measurement system failure. There may be various potential causes of pose measurement system failure. These causes may include sensor failure, hardware failure, software bugs, communication failure, loss of power, and or other types of failure. These failures may result in unreliable, "bad" quality pose data making operation of the autonomous vehicle challenging. Furthermore, even if the pose measurement system fails and/or provides unreliable, "bad" quality pose data, it may still be desirable for the autonomous vehicle to continue to operate safely and/or efficiently. Accordingly, a system and method are described that may address these and/or other challenges.

A method may be executed by a vehicle computer system of an autonomous vehicle. The vehicle computer system may receive first pose data from a first pose measurement system and second pose data from a second pose measurement system. Each of the first and second pose measurement systems may have their own corresponding sensors. The vehicle computer system may continue to execute the method by determining a first pose data quality for the first pose data and a second pose data quality for the second pose data. The vehicle computer system may also set the vehicle pose data for the autonomous vehicle to the first pose data based on at least the first pose data quality and the second pose data quality. For example, the vehicle computer system may determine that the first pose data quality is better than the second pose data quality, and thus, set the vehicle pose data for the autonomous vehicle to the first pose data. Next, the vehicle computer system may control the autonomous vehicle based on the vehicle pose data. For example, the vehicle computer system may determine that the vehicle pose data has a pose data quality of "good," and thus, control the vehicle to continue driving under normal operation.

The first pose measurement system may determine pose data based on one or more sensors corresponding to the first pose measurement system. The sensors may include three-axis gyroscopes, three-axis accelerometers, IMUs, GPS receivers, wheel speed sensors, and/or other sensors of the autonomous vehicle. The pose measurement system may also employ a processor (CPU) to determine pose data. The pose data determined based off the sensors by the CPU may indicate the position, orientation, and velocity of the autonomous vehicle relative to the world. The pose measurement system may stop transmitting pose data to the vehicle computer system in response to failure of the corresponding sensors and/or the CPU.

The vehicle computer system may receive pose data from two independent pose measurement systems to improve the quality of the pose data received and used by the vehicle computer system. In particular, if pose data from one pose measurement system is not sent or has a "bad" pose data quality, the vehicle computer system can instead rely on pose data from the other pose measurement system. Each pose measurement system relies on an independent communication channel to send pose data to the vehicle computer system. Each pose measurement system has one or more corresponding sensors that are independent of the sensors of the other pose measurement system. By relying on independent sensors, each pose measurement system can provide an independent measurement of pose data of the autonomous vehicle to the vehicle computer system.

Each pose measurement system may determine a pose data quality associated with the pose data before transmission to the vehicle computer system. The pose data quality, in one embodiment, may be rated as "bad," "marginal," or "good." The pose measurement system may determine pose data quality using various methods, including crosschecking of the corresponding sensors, verification that sensor outputs are within plausible ranges, Kalman filter covariance tracking, and/or other measures of confidence in the received sensor data. Poor sensor crosschecks, implausible sensor outputs, and/or poor confidence in received data can cause the pose data quality to be downgraded to "bad" or "marginal." In other embodiments, pose data quality may have more, fewer, and/or different ratings than "bad," "marginal," and "good."

The vehicle computer system may execute pose monitor software that receives pose data from the pose measurement systems and sets the vehicle pose data. The pose monitor software may receive a pose data message from each pose measurement system. A pose data message may include pose data from the pose measurement system, pose data quality for the pose data, and a timestamp. The pose measurement system software may receive a first pose data message from the first pose measurement system and a second pose data message from the second pose measurement system. The pose monitor software may use the data from both the first and second pose data messages to update pose data quality from both messages.

The pose monitor software may alter the pose data quality of the received pose data in several instances. These instances can include early timestamps, late timestamps, and out-of-range pose data values (e.g., a pose data value of infinity). Another instance for downgrading pose data may occur if pose data from a pose measurement system is inconsistent. For example, if the pose data from a pose measurement system indicates a high velocity, but does not show the vehicle position as changing over time, then the pose data from the pose measurement system may be considered inconsistent and result in the pose data quality being adjusted to "bad." Yet another instance for downgrading pose data may be in response to cross comparing first and second pose data. For example, if the first and second pose data are compared and the data differ, then one or both of the corresponding pose data quality values may be downgraded to "marginal" or "bad," depending on the severity of the disagreement. Other scenarios may exist in which the pose monitor software further adjusts the pose data quality of the received pose data.

Once the pose data quality has been adjusted, the pose monitor software may set the vehicle pose data to the received pose data with the higher pose data quality. If the pose data quality of the first pose data and the second pose data is the same, then the pose monitor software may not change the source of the pose data. In other words, the vehicle pose data source may remain the first pose data until the second pose data has a pose data quality that is better than the first vehicle pose data.

The pose monitor software may also determine and track the offset between the first pose data and the second pose data. By tracking the offset, the pose monitor software can smoothly transition the vehicle pose data from the first pose data to the second pose data. For example, if a first pose data quality is "bad" and includes a very different position (e.g., 10 miles) from the position of the second pose data, and the second pose data quality is "good," then the pose monitor software may change the vehicle pose data from the first pose data to the second pose data. However, a rapid, large change in the position of the vehicle pose data (e.g., 10 miles) may be detrimental to the autonomous vehicle operating safely and efficiently. Thus, the pose monitor software may use the offset (e.g., 10 miles) to gradually adjust the position of the vehicle pose data from the first pose data position to the second pose data position over a period of time.

The vehicle computer system may rely on the vehicle pose data to control operation of the autonomous vehicle. In some embodiments, the vehicle computer system may control autonomous vehicle operation based on the vehicle pose data quality. For example, if the latest vehicle pose data is too old, or has a vehicle pose data quality of "bad", the vehicle computer system may control the autonomous vehicle to stop as quickly as possible. If the latest vehicle pose data quality is "marginal", the vehicle computer system may control the autonomous vehicle to park as soon as possible, park in the next 10 seconds, or to park after finishing the trip. If the vehicle pose data quality is "good", then the vehicle computer system may control the autonomous vehicle to continue driving under normal operation. Other embodiments are also possible. By relying on independent, redundant, pose measurement systems, the autonomous vehicle can operate efficiently and safely while relying on less expensive pose measurement system hardware.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to capture an image with a camera in vehicle 100, analyze the image for the presence of a turn signal indicator, and responsively control vehicle 100 based on the presence of the turn signal indicator. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine, or some other engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway map data 166, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data 166 stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

The computer system 112 could carry out several determinations based on the indications received from the input- and output-indication sensors. For example, the computer system 112 could calculate the direction (i.e. angle) and distance (i.e. range) to one or more objects that are reflecting radar signals back to the radar unit 126. Additionally, the computer system 112 could calculate a range of interest. The range of interest could, for example, correspond to a region where the computer system 112 has identified one or more targets of interest. Additionally or additionally, the computer system 112 may identify one or more undesirable targets. Thus, a range of interest may be calculated so as not to include undesirable targets.

In some embodiments, the computer system 112 may make a determination about various objects based on data that is provided by systems other than the radar system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
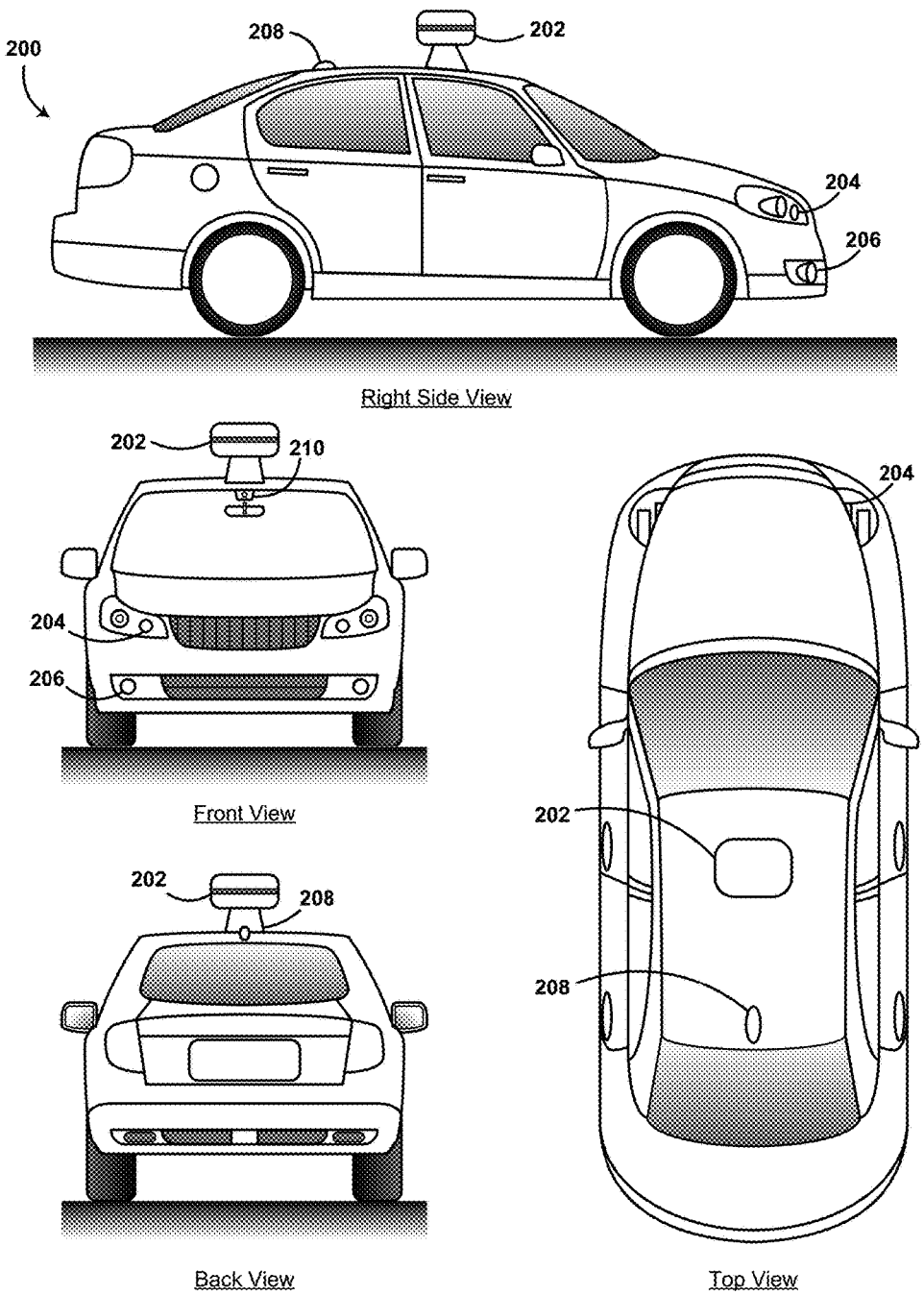
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 208, a radar 206, a laser rangefinder 204, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 204.

The wireless communication system 208 could be located as depicted in FIG. 2. Alternatively, the wireless communication system 208 could be located, fully or in part, elsewhere. The wireless communication system 208 may include wireless transmitters and receivers that could be configured to communicate with devices external or internal to the vehicle 200. Specifically, the wireless communication system 208 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
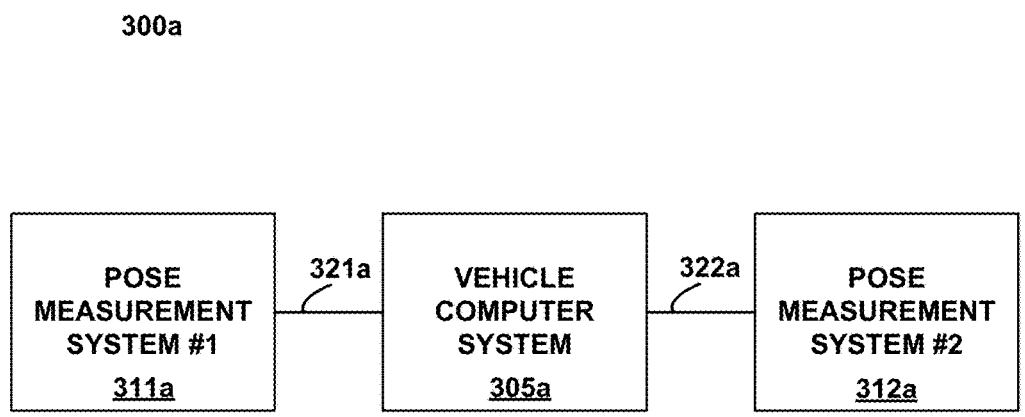
FIG. 3A is a vehicle computer system, according to an example embodiment.

FIG. 3A shows a vehicle computer system communication environment 300a. The environment 300a includes a vehicle computer system 305a, a first pose measurement system 311a, a second pose measurement system 312a, a first communication channel 321a, and a second communication channel 322a. In some embodiments, the environment 300a may include more, fewer, and/or different components than those displayed in FIG. 3A.

Figure 3B:
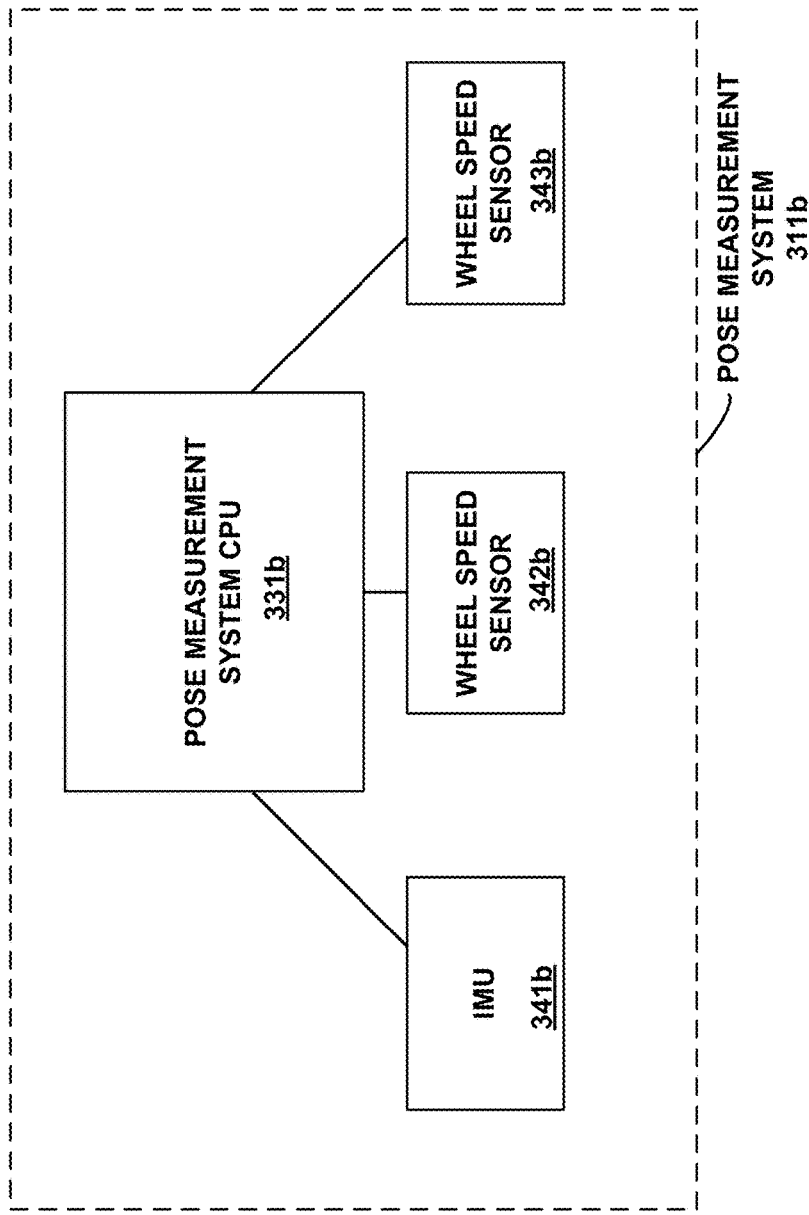
FIG. 3B is a pose measurement system, according to an example embodiment.

FIG. 3B shows an example pose measurement system 311b. The pose measurement system 311b may include a pose measurement system CPU 331b, an IMU 341b, a wheel speed sensor 342b, and a GPS receiver 343b. In other embodiments, the pose measurement system 311b may include more, fewer, and/or different components than those displayed in FIG. 3B.

Pose measurement system 311b may correspond to pose measurement systems in FIG. 3A (e.g., pose measurement systems 311a and 312a). Pose measurement system 311b determines pose data (e.g., position, orientation, and velocity relative to the world) of an autonomous vehicle. Pose measurement system 311b also determines pose data quality for the determined pose data. Pose measurement system 311b may transmit the pose data and pose data quality to a vehicle computer system (such as the vehicle computer system 305a of FIG. 3A) to improve control of the autonomous vehicle. The pose measurement system 311b may rely on pose measurement system CPU 331b to execute some or all of the above functions.

The pose measurement system CPU 331b may determine pose data for an autonomous vehicle based on one or more corresponding sensors of the pose measurement system 311b. Additionally, CPU 331b may determine the pose data quality of the determined pose data, and transmit the pose data and pose data quality to the vehicle computer system (e.g., vehicle computer system 305a in FIG. 3A) for further processing. The pose measurement system CPU 331b may be a dual-core, lockstep CPU that is safety rated for automotive vehicles. However, other types of CPUs may be used for the pose measurement CPU 331b.

The CPU 331b may stop transmission of pose data to the vehicle computer system in a few instances. In one instance, if a temporary or permanent hardware failure occurs (e.g., a cosmic ray) that causes one of the cores to act differently from the other core, the CPU may stop transmitting pose data to the vehicle computer system. In another instance, the CPU may perform multiple software checks to verify that the CPU may continue transmitting pose data. If one of the software checks fails, then the CPU may stop transmitting pose data to the vehicle computer system. For example, if pose data is generated that includes floating point NaN values (Not a Number values), out of range data values, values of infinity, or other unexpected values, the CPU 331b may stop transmitting pose data to the vehicle computer system. By stopping transmission of pose data in these instances, the CPU 331b prevents the vehicle computer system from receiving unexpected values for pose data that may diminish control of the autonomous vehicle.

Pose measurement system 311b may also include one or more corresponding sensors. In FIG. 3B, the pose measurement system 311b include sensors IMU 341b, wheel speed sensor 342b, and GPS receiver 343b. The sensors of the system 311b may provide data to CPU 331b for determining pose data for the autonomous vehicle. In some embodiments, the pose measurement system 311b includes more, fewer, and/or different sensors than those displayed. Additionally, the system 311b may include duplicate sensors. For example, the system 311b may include multiple IMUs 341b. In this case, the pose measurement system 311b may still continue providing pose data when an IMU sensor fails because the pose measurement system CPU 331b receives data from the other IMU sensors.

The IMU 341b may include gyroscopes, accelerometers, and other devices to provide data about the position, velocity, and acceleration of the autonomous vehicle. IMU 341b may correspond to inertial measurement unit 124 of FIG. 1, in some embodiments. Although FIG. 3B only displays one IMU sensor 341b, in some embodiments, a pose measurement system 311b may include multiple IMUs 341b. CPU 331b may use the IMU data to determine pose data for the autonomous vehicle. In other embodiments, other sensors may provide position, velocity, and/or acceleration data of the autonomous vehicle to the vehicle computer system.

Wheel speed sensors 342b may also provide data to the pose measurement CPU 331b to determine pose data for the pose measurement system 311b of the autonomous vehicle. The wheel speed sensors 342b may indicate the rotational speed of each tire of the autonomous vehicle to the CPU 331b. The data provided by the wheel speed sensors 342b may improve the pose data determined by the CPU 331b. For example, the wheel speed sensor data may be compared and/or crosschecked with the IMU data by the CPU 331b.

In some embodiments, the wheel speed sensors 342b may be shared by multiple pose measurement systems, such as pose measurement systems 311a and 312a. In other words, common wheel speed sensors 342b may provide data to multiple pose measurement systems, such as systems 311a and 312a. Using common wheel speed sensors with multiple pose measurement systems may reduce monetary costs for the sensors used to determine pose data for the autonomous vehicle. However, in other embodiments, each pose measurement system may have its own set of corresponding wheel speed sensors. In other embodiments, different sensors may be used in combination with IMU data to improve the pose data determined by the CPU 331b for system 311b.

A GPS receiver may also provide data to the CPU 331b for determining pose data of the autonomous vehicle by pose measurement system 311b. The GPS receiver 343b may correspond to the GPS 122 of FIG. 1. The GPS receiver data 343b may further allow the CPU 331b to crosscheck data received from IMU 341b and wheel speed sensors 342b to better determine pose data for the autonomous vehicle by pose measurement system 311b. In other embodiments, other sensors may be used for determining pose data.

The pose measurement system CPU 331b may also determine the pose data quality of the determined pose data. Pose data quality may indicate the reliability of the pose data. In some embodiments, the pose data quality may be determined to be either "good," "marginal," or "bad." In other embodiments, pose data quality determination may be more granular. For example, a pose data quality percentage value may indicate pose data quality, with 0% indicating the lowest pose data quality and 100% indicating the highest pose data quality. Other metrics, scales, scoring systems, rating systems, judgments, and/or quality measurement systems may be used for determining pose data quality. The vehicle computer system may determine whether to use the pose data for autonomous vehicle control based on the pose data quality. In other embodiments, pose data quality may be used for other purposes.

Pose data quality may be degraded from "good" to "marginal" or "bad" for a variety of reasons. Sensor failure (e.g., accelerometers, gyroscopes, your sensor, GPS receiver, wheel speed sensor, etc.) that occurs gradually or quickly may lead to degraded pose data quality. Other reasons that pose data quality may be downgraded include loss of data due to poor data communication connections, hardware failures, mechanical failures, skidding tires, and/or other reasons. In response, the CPU 331b may rely on a variety of methods to determine pose data quality.

First, CPU 331b may rely on Kalman filters to determine pose data quality. Various types of data (e.g., sensor data from IMUs 341b, wheel speed sensors 342b, and/or GPS receivers 343b) may be inputted into a Kalman filter. The Kalman filter may be used to determine the covariance of the data, which may indicate an uncertainty of the data. In particular, a higher covariance may indicate a higher uncertainty of the data. Thus, sensor data inputted into a Kalman filter that results in a high covariance may cause the pose data quality to be downgraded from "good" quality to "marginal" or "bad" pose data quality. Other methods for determining uncertainty and/or confidence data may be used to determine pose data quality.

Second, CPU 331b may check to determine whether the received sensor data is out of range. For example, IMU 341b may provide sensor data indicating velocity of the autonomous vehicle. The sensor data indicating velocity may have a valid range from 0 miles per hour to 85 miles per hour in a particular direction. Thus, if sensor data is received indicating a velocity of 100 miles per hour, the pose data quality may be downgraded to "marginal" or "bad" by the CPU 331b. Other examples are also possible.

Third, CPU 331b may crosscheck received data to determine the quality of the pose data. For example, CPU 331b may crosscheck velocity values of the autonomous vehicle determined based on different sensor data, such as IMU 341b, wheel speed sensor 342b, and GPS receiver 343b. If the sensor data from the wheel speed sensor 342b and the GPS receiver 343b indicate that the vehicle is stationary (e.g., a vehicle velocity of 0 miles per hour in all directions) and the IMU 341b indicates a vehicle velocity of 10 miles per hour East, then the CPU 331b may determine that the crosscheck has failed. In response to the failed crosscheck, the CPU 331b may downgrade the pose data quality from "good" quality to "marginal" or "bad" pose data quality. The CPU 331b may crosscheck received data with values from other sensors (not displayed) or derived values. For example, a derived value (such as expected turn radius of the vehicle) may be crosschecked with sensor data (such as turn rate from IMU 341b) to further determine the quality of the pose data. Other examples are possible.

Referring to FIG. 3A, the vehicle computer system 305a determines which pose data from pose measurement systems to set as the vehicle pose data and controls operation of the autonomous vehicle based on the set vehicle pose data. In some embodiments, the vehicle computer system 305a may correspond to the computer system 112 of FIG. 1. The vehicle computer system 305a may include pose monitor software that receives pose data for the autonomous vehicle from multiple pose measurement systems. The pose monitor software may determine which pose data to set as the vehicle pose data and monitor the pose data offset between the received pose data. By receiving pose data from multiple pose measurement systems (e.g., systems 311a and 312a from FIG. 3A), the vehicle computer system 305a can better determine whether reliable pose data is available for control of the autonomous vehicle. Accordingly, this improves control of the autonomous vehicle, as described in FIG. 3A.

The vehicle computer system 305a receives pose data from two independent pose measurement systems: pose measurement system 311a and pose measurement system 312a. In some embodiments, using two independent pose measurement systems (as opposed to three or more systems) may be a cost-effective solution for determining vehicle pose data with independent, redundant pose measurement systems. In some embodiments, the vehicle computer system 305a may receive pose data from more than two independent pose measurement systems.

Redundant, independent pose measurement systems allow the vehicle computer system 305a to determine vehicle pose data for the autonomous vehicle despite hardware and/or software failures resulting in "marginal" and/or "bad" quality pose data. For example, if one pose measurement system fails or provides "bad" quality pose data (e.g., system 311a), the other pose measurement system (e.g., system 312a) may still provide "good" quality pose data for the vehicle. Thus, the vehicle computer system may still control the autonomous vehicle to drive under normal operations using vehicle pose data with a "good" pose data quality. If the vehicle computer system 305a could only rely on the failed pose measurement system or "bad" quality pose data, the vehicle computer system 305a may be forced to control the autonomous vehicle to cease normal driving operation and stop and park. Thus, independent, redundant pose measurement systems may improve control and operation of the autonomous vehicle by the vehicle computer system 305a.

Independent pose measurement systems may be independent for a few reasons. First, as shown in FIG. 3B, each pose measurement system (e.g., systems 311a and 312a from FIG. 3A) may include a pose measurement system CPU 331b. If the CPU 331b fails for one pose measurement system (e.g., system 311a from FIG. 3A), the CPU 331b for the other pose measurement system (e.g. system 311b from FIG. 3B) remains unaffected and may still determine and transmit pose data with a "good" pose data quality.

Second, each pose measurement system may include one or more corresponding sensors. For example, in FIG. 3B, each pose measurement system (such as systems 311a and 311b) may include one or more corresponding sensors, such as IMU 341b, wheel speed sensors 342b, and GPS receiver 343b. If the IMU 341b for system 311a from FIG. 3A fails, the pose measurement system 312a from FIG. 3A may still rely on its own corresponding IMU sensor 341b to determine pose data with a "good" pose data quality. Although some sensors may be shared by the pose measurement systems 311a and 312a in some embodiments (e.g., wheel speed sensors 342b and/or GPS receiver 343b from FIG. 3B), in other embodiments, each pose measurement system 311a and 312a may include their own corresponding sensors. Other embodiments are possible.

Third, each independent pose measurement system 311a and 312a may rely on its own independent communication channel to transmit a pose data message from the CPU 331b of the pose measurement system to the vehicle computer system 305a. In particular, pose measurement system 311a sends pose data messages to vehicle computer system 305a via independent communication channel 321a. Pose measurement system 312a sends pose data messages to vehicle computer system 305a via independent communication channel 322a. As a result, if communication channel 321a fails, pose measurement system 312a is unaffected and can still transmit pose data messages to vehicle computer system 305a via communication channel 322a. As a result, vehicle computer system 305a can still set the vehicle pose data to pose data with a "good" pose data quality that is received from system 312a, despite the failure of the communication channel 321a. By using independent communication channels, independent pose measurement system CPUs, and corresponding sensors for each pose measurement system, independent and redundant pose measurement systems can enable the vehicle computer system to continue normal driving operation for an autonomous vehicle and withstand hardware failures and/or "bad" quality pose data.

Each pose measurement system 311a and 312a transmits pose data messages to the vehicle computer system 305 via its independent communication channel (e.g., communication channels 321a and 322a, respectively). Each pose data message includes pose data determined by the corresponding pose measurement system, pose data quality of the transmitted pose data, and a timestamp indicating a time approximating when the message was generated by the pose measurement system. The timestamp may be used by the vehicle computer system 305a to downgrade pose data quality for received pose data due to the pose data being too old. In other embodiments, the pose data message may include more, fewer, and/or different types of information.

FIG. 3C displays a table 351c indicating autonomous vehicle control based on vehicle pose data of the autonomous vehicle. The table 351c includes a first pose measurement system pose data quality column 352c, a second pose measurement system pose data quality column 353c, a vehicle pose data column 354c, and a control output column 355c. In other embodiments, the table 351c may include more, fewer, and/or different columns, rows, and/or table entries than those displayed in FIG. 3A.

Table 351c includes pose measurement system pose data quality column 352c. Column 352c indicates the pose data quality of pose data received by a pose measurement system, such as pose measurement system 311a from FIG. 3A. In table 351c, the pose data received from pose measurement system number one has a pose data quality of "good" in rows one, two, and three, a pose data quality of "marginal" in rows four, five, and six, and a pose data quality of "bad" in rows seven, eight, and nine. Other entries in table 351c are possible.

Table 351c also includes pose measurement system pose data quality column 353c. Column 353c indicates the pose data quality of pose data received by pose measurement system, such as pose measurement system 312a from FIG. 3A. The pose measurement system for column 353c is different from the pose measurement system for column 352c. In table 351c, pose data received from pose measurement system number two has a pose data quality of "good" in rows one, four, and seven, a pose data quality of "marginal" in rows two, five, and eight, and pose data quality of "bad" in rows three, six, and nine. Other entries in table 351c are also possible.

After pose data quality is determined by CPU 331b of a respective pose measurement system (e.g., systems 311a and 312a from FIG. 3A), the vehicle computer system 305a may process the received pose data from both pose measurement systems and update the pose data quality of the received pose data. The vehicle computer system may rely on several methods to update pose data quality of received pose data. Similar to CPU 331b, the vehicle computer system 305a may first verify the received pose data is a plausible data value within the range of the sensor data. For example, values of infinity, not a number (Not a Number), or out of range values, similar to the example discussed for CPU 331b, would cause the vehicle computer system to update the value with a plausible value within the data range of the sensor. The vehicle computer system may also change the pose data quality to "bad" for the corresponding pose data.

The vehicle computer system may also update pose data quality for pose data based on the timestamp of the received pose data message. In particular, pose data quality may be downgraded by the vehicle computer system to "bad" when the pose data message reception time is too far in the past, when the timestamp indicates a time too far in the past, or when the timestamp indicates a time in the future. Other embodiments are also possible.

The vehicle computer system may also verify that the pose data received by a particular pose measurement system over a period of time is consistent. For example, the vehicle computer system 305a may verify that pose data received over a period of time from pose measurement system 311a is consistent. In one example, vehicle computer system 305a may receive pose data from system 311a over a period of time indicating a high velocity for the autonomous vehicle during that time period. However, the pose data may also indicate that the autonomous vehicle position hasn't changed during the time period. As a result, the vehicle computer system 305a may determine that the pose data received from system 311a during the time period is inconsistent. The vehicle computer system may also update the pose data quality to "bad" for the received pose data from system 311a.

The vehicle computer system may also crosscheck sensor data received from both pose measurement systems. In some embodiments, the vehicle computer system only crosschecks data between the pose measurement systems when neither of the pose measurement systems generate pose data with a "bad" pose data quality. When the sensor data of the two different pose measurement systems are crosschecked, the pose data quality of the compared pose data may be downgraded to "marginal" or "bad", depending on the magnitude of the difference in the pose data.

For example, if the pose measurement system 311a indicates that the autonomous vehicle is traveling 30 miles per hour, while the pose measurement system 312a indicates that the autonomous vehicle is stationary, the pose data quality of the pose data received from 311a and/or 312a may be downgraded to "bad". Alternatively, if system 311a indicates a vehicle velocity of 30 miles per hour, and system 312a indicates a slightly different vehicle velocity (e.g., 27 miles per hour), the pose data quality of the pose data received from 311a, 312a, or both 311a and 312a may be downgraded to "marginal." The vehicle computer system may also crosscheck received data with values from other sensors that are not part of a pose measurement system (not displayed), derived values, or other values. For example, a derived value (such as expected turn radius of the vehicle) may be crosschecked with sensor data (such as turn rate from an IMU of a pose measurement system) to further determine the quality of the pose data. Other embodiments are also possible.

In some embodiments, the vehicle computer system may receive and/or store additional information about pose data with a "marginal" pose data quality. The additional information may indicate why the pose data quality was downgraded to "marginal." The additional information may be received as part of the pose data message, or in a separate message. The additional information may be received from a pose measurement system. By receiving and/or storing the additional information, the vehicle computer system may generate different control outputs for the same pose data quality (e.g., "marginal" pose data quality).

For example, additional information may be received and/or stored by the vehicle computer system from a pose measurement system. The additional information may indicate that the pose data quality for pose data was downgraded to "marginal" due to a gradually failing yaw sensor. In particular, the quality may be downgraded to "marginal" because the yaw sensor failed by an amount greater than a first threshold. For another example, the additional information stored may indicate the pose data quality for pose data was downgraded to "marginal" because the yaw sensor failed by an amount larger than a second threshold that exceeds the first threshold. In other embodiments, additional information may be stored for other pose data quality values, such as "good" and "bad" pose data quality, to enable the vehicle computer system to generate multiple control outputs for pose data with "good" or "bad" pose data quality. The description accompanying FIG. 3C explains how multiple control outputs can be generated for a pose data quality value based on the received and/or stored additional information.

Column 354c indicates the pose data set as the vehicle pose data by the vehicle computer system (e.g., vehicle computer system 305a from FIG. 3A). The pose data can be pose data received by pose measurement system number one from column 352c or pose data received from pose measurement system number two from column 353c. A table entry in column 354c of "pose data #1" indicates that the vehicle pose data is set to the pose data received from pose measurement system number one of column 352c. A table entry of "pose data #2" in column 354c indicates that the vehicle pose data is set to the pose data received from pose measurement system number two for column 353c. A table entry of "pose data number one or pose data #2" in column 354c indicates that the vehicle pose data can be set to the pose data received from either pose measurement system number one for column 352c or pose measurement system number two for column 353c. In table 351c, the vehicle pose data of column 354c is set to "pose data number #1" for rows two, three, and six. In table 351c, the vehicle pose data of column 354c is set to "pose data number #2" for rows four, seven, and eight. In table 351c, the vehicle pose data of column 354c is set to "pose data #1 or pose data #2" for rows one, five, and nine. Other table entries and other embodiments are also possible.

The vehicle computer system 305a may set the vehicle pose data to pose data received from either the first pose measurement system or the second pose measurement system based on the pose data quality of the received pose data. The vehicle computer system 305a may set vehicle pose data at a frequency of 1000 Hz. For example, the vehicle computer system may set the vehicle pose data to the received pose data with the highest pose data quality. In FIG. 3C, "good" pose data quality is the highest pose data quality, "bad" pose data quality is the lowest pose data quality, and "marginal" pose data quality is in between "good" and "bad" pose data quality. If the pose data received from both pose measurement systems have the same pose data quality, then the vehicle computer system may select pose data from either pose measurement system. In one embodiment, if the pose data received from both pose measurements systems have the same pose data quality, then the vehicle computer system selects pose data from the pose measurement system that provided the last set of pose data. In other words, the vehicle computer system 305a may switch the source of the vehicle pose data when pose data quality of pose data received from the current source pose measurement system is less than the pose data quality of pose data received from a different pose measurement system.

For example, if the vehicle computer system 305a initially sets the vehicle pose data to pose data received from pose measurement system number one, the vehicle computer system 305a will continue to set the vehicle pose data as "pose data #1" until pose data received from the pose measurement system number two has a higher pose data quality (see column 353c) than the pose data quality of the pose data received from the first pose measurement system (see column 352c). Thus, referring to FIG. 3C, in table 351c, the vehicle computer system changes the vehicle pose data from pose data number one to pose data number two for rows four, seven, and eight because the pose data quality of the pose data from pose measurement system number two (see column 353c) is higher than the pose data quality of the pose data received from pose measurement system number one (see column 352c). Other embodiments are also possible.

The vehicle computer system 305a may determine and monitor a pose data offset to assist with changing the vehicle pose data source from the first pose measurement system to the second pose measurement system. The pose data offset represents the difference between pose data received from the first pose measurement system (e.g., 311a from FIG. 3A) and pose data received from the second pose measurement system (e.g., 312a from FIG. 3A). The pose data offset can allow the vehicle computer system 305a to gradually transition the vehicle pose data from pose data from a first pose measurement system to pose data from the second pose measurement system. The gradual transition may allow for better control of the autonomous vehicle.

For example, the vehicle computer system 305a from FIG. 3A may receive pose data from pose measurement system 311a indicating a first position of the autonomous vehicle at a particular time. The vehicle computer system 305a may also receive pose data from pose measurement system 312a indicating a second position of the autonomous vehicle at the same particular time. The second position indicated by pose measurement system 312a may be 5 miles east of the first position indicated by pose measurement system 311a. Thus, the vehicle computer system may determine that the pose data offset is 5 miles.

The pose data quality of the pose data received from the second pose measurement system 312a may be higher than the pose data quality of the pose data received from the first pose measurement system 311a. The vehicle computer system may have initially been using the first pose measurement system 311a as a source for the vehicle pose data. Because the pose data from system 311a has a higher quality than the pose data of system 312a has, the vehicle computer system 305a may determine to change the source of the vehicle pose data from system 311a to system 312a.

This example may correspond to row seven of table 351c, in which the first pose measurement system 311a is providing pose data with a "bad" pose data quality, while the second pose measurement system 312a is providing pose data with a "good" pose data quality. In this example, the vehicle computer system 305a changes the vehicle pose data source to the second pose measurement system 312a, as shown by row seven of column 354c, which states "pose data #2".

Because the pose data offset is 5 miles, an immediate change by the vehicle computer system 305a from the pose data of the first pose measurement system to pose data of the second pose measurement system may result in diminished or poor control of the autonomous vehicle. Instead, the vehicle computer system 305a may modify the vehicle pose data such that the vehicle pose data gradually transitions from the first pose data from system 311a to the second pose data from system 312a. In some embodiments, the vehicle computer system 305a may use interpolation to gradually transition the vehicle pose data from the pose data of the first pose measurement system to the pose data of the second pose measurement system. The gradual transition of vehicle pose data may prevent unwanted control outputs to the autonomous vehicle in response to hey sudden 5 miles east change in vehicle pose data. Other embodiments are also possible.

Column 355c indicates the control output by the vehicle computer system (e.g. vehicle computer system 305a from FIG. 3A) based on the vehicle pose data 354c and the corresponding vehicle pose data quality (see column 352c or 353c). The vehicle computer system may include trajectory software that determines and/or outputs control outputs affecting the autonomous vehicle driving operations. The trajectory software may consume as data inputs the vehicle pose data and/or pose data quality from the pose monitor software to generate the control outputs.

The vehicle computer system 305a may determine a control output for the autonomous vehicle based on the pose data quality of the vehicle pose data. When the pose data quality of the vehicle pose data is "good", the control output of the vehicle computer system may be "normal" (see rows one, two, three, four, and seven in column 355c of table 351c). In other words, the vehicle computer system 305a allows the autonomous vehicle to continue operating normally when the vehicle pose data quality is "good." Normal operation of the autonomous vehicle may include driving at a certain speed, driving within the speed limit, turning, stopping, parking, lane changing, accelerating, decelerating, and/or other vehicle operations during normal operation of the autonomous vehicle. In some embodiments, the vehicle computer system may only generate a "normal" control output when the pose data quality of the pose data for all pose measurement systems is "good" (see row one of table 351c). In this case, a different control output (such as "pull over and park" or "finish the trip" or some other output) may be generated when some, but not all, of the received pose data has a pose data quality of "good" (such as rows two, three, four, and seven of table 351c) to cause the vehicle to stop. For example, for rows two and four of table 351c, a control output of "finish the trip" may be generated (not displayed) due to "marginal" quality pose data being received from a pose measurement system, while a control output of "pull over and park" may be generated (not displayed) for rows three and seven of table 351c due to "bad" quality pose data being received from a pose measurement system.

When the vehicle computer system 305a determines that pose data quality of the vehicle pose data is downgraded to "marginal", the vehicle computer system 305a may generate a control output to override the operation of the autonomous vehicle. In FIG. 3C, vehicle pose data with a "marginal" pose data quality causes the vehicle computer system 305a to generate a control output for the vehicle to pull over and park (see rows five, six, and eight of column 355c). In some embodiments, this control output may indicate that the autonomous vehicle may pull over and park the vehicle as soon as it is safe to do so. In other embodiments, the autonomous vehicle may pull over to a safe place and park the vehicle within a predetermined period of time. The period of time may be 5 seconds, 15 seconds, 60 seconds, or some other amount of time. Other autonomous vehicle operations and/or control outputs are also possible.

When the pose data quality of the vehicle pose data is downgraded to a quality of "bad", the vehicle computer system 305a may generate a control output of "emergency brake" to override current operation of the autonomous vehicle. In some embodiments, the control output "emergency brake" may indicate that the autonomous vehicle will safely pull over and stop. In other embodiments, the control output "emergency brake" may cause the autonomous vehicle to stop immediately. Other autonomous vehicle operations in response to the control output are also possible.

In some embodiments, the vehicle computer system 305a may respond to degraded pose data quality ("bad" or "marginal" pose data quality) of the vehicle pose data by generating a control output for assisted mode driving. During assisted mode, the vehicle control system 305a allows a person to control and/or drive the vehicle. In some embodiments, the vehicle control system 305a may request the person to control and/or drive the vehicle during assisted mode driving. In other embodiments, vehicle control system 305a may require the person to control and/or drive the vehicle during assisted mode driving. In some embodiments, the vehicle control system 305a may generate a control output for assisted driving mode only when a person is detected in the autonomous vehicle. In other embodiments, the autonomous vehicle may not have an assisted mode. Other embodiments are also possible.

Although not displayed in FIG. 3C, the vehicle computer system 305a may have a hierarchy of control outputs that include more control outputs than those displayed in table 351c of FIG. 3C. As mentioned earlier, different control outputs may be generated for a particular pose data quality using received and/or stored additional information. For example, pose data with a "marginal" pose data quality may generate multiple types of control outputs based on the additional information explaining the pose data quality is "marginal."

In one embodiment, a control output of "finish the trip" may be generated based on vehicle pose data with a "marginal" pose data quality and additional information indicating the yaw sensor failed by an amount greater than a first threshold. If the yaw sensor failure amount increases and exceeds a second threshold that is larger than a first threshold, then the pose data quality may remain "marginal," but the control output generated may change to "pull over and park." In this way, multiple control outputs may be generated for a single pose data quality based on received and/or stored additional information. The multiple control outputs and the outputs displayed in table 351c may be part of a hierarchy of control outputs generated by the vehicle computer system 305a based on pose data quality of the vehicle pose data and/or other additional information. Other embodiments are also possible.

Figure 4:
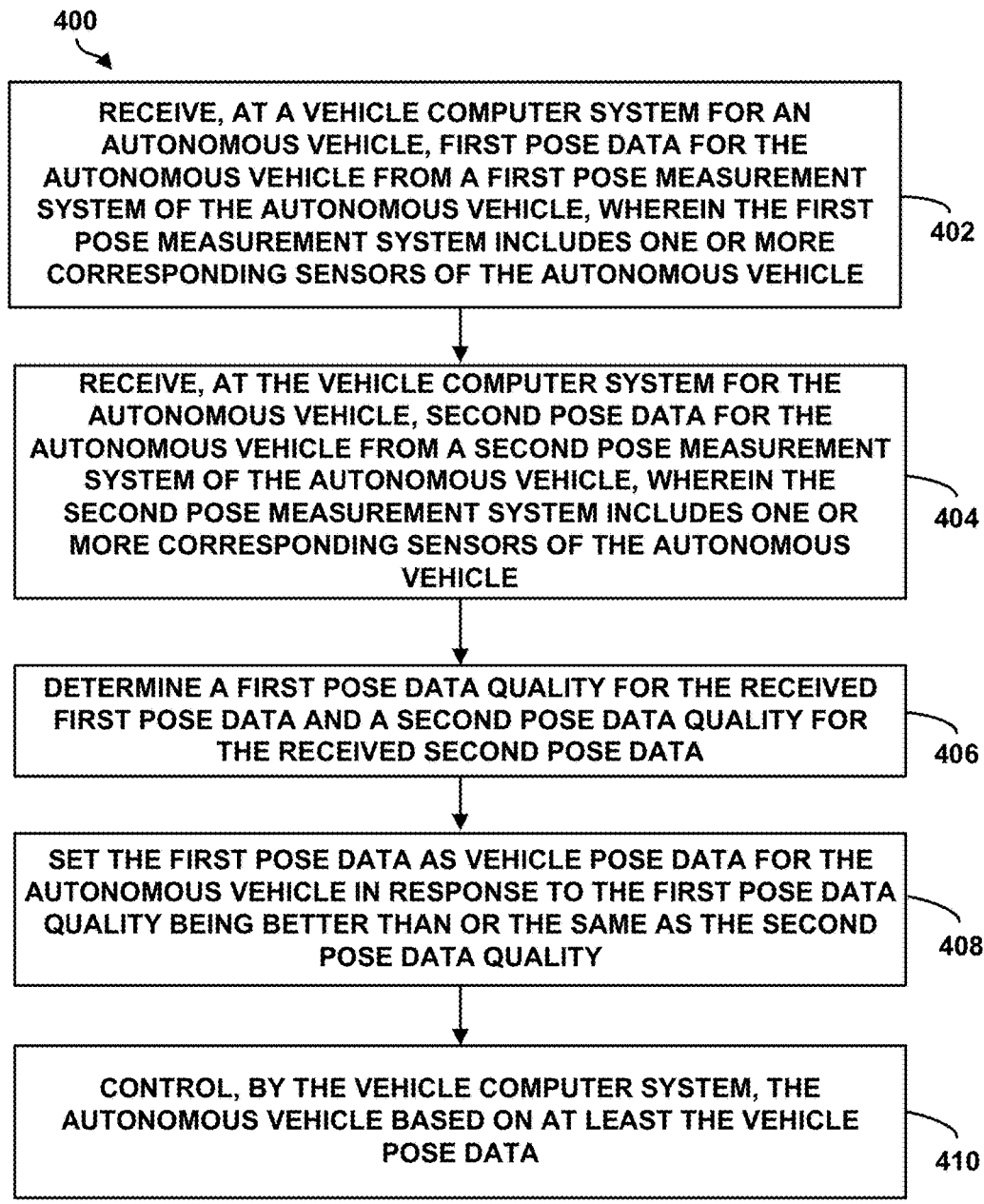
FIG. 4 is a flowchart of an example method.

FIG. 4 illustrates a flowchart showing the method 400 that may allow for determining vehicle pose data, according to an example embodiment. The method 400 may be carried out by a vehicle computer system, such as the vehicle computer system illustrated and described with respect to FIG. 1 and FIG. 3A. However, other computing devices for an autonomous vehicle may also execute method 400.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 4. Where used, program code can be stored on any type of computer-readable medium, for example, such as a storage device including a disk or hard drive.

In addition, each block of the flowchart shown in FIG. 4 may represent circuitry that is wired to perform the specific logical functions in the process. Unless specifically indicated, functions in the flowchart shown in FIG. 4 may be executed out of order from that shown or discussed, including substantially concurrent execution of separately described functions, or even in reverse order in some examples, depending on the functionality involved, so long as the overall functionality of the described method is maintained.

As shown by block 402 of FIG. 4, method 400 may involve receiving, at a vehicle computer system for an autonomous vehicle, first pose data for the autonomous vehicle from a first pose measurement system of the autonomous vehicle, wherein the first pose measurement system includes one or more corresponding sensors of the autonomous vehicle. In some examples, the pose data may describe a position, orientation, and velocity of the autonomous vehicle relative to the world. In additional examples, the pose measurement system may include corresponding sensors, such as IMUS, wheel speed sensors, and/or a GPS receiver.

Method 400 may further involve receiving, at the vehicle computer system for the autonomous vehicle, second pose data for the autonomous vehicle from a second pose measurement system of the autonomous vehicle, wherein the second pose measurement system includes one or more corresponding sensors of the autonomous vehicle, as shown by block 404 of FIG. 4. In some examples, the second pose data may describe the position, orientation, and velocity of the autonomous vehicle relative to the world. In further examples, the second pose data may be different from the first pose data. In additional examples, the second pose measurement system may include sensors, such as IMUs, GPS receivers, and wheel speed sensors, that are different from the sensors of the first pose measurement system.

Method 400 may also involve determining a first pose data quality for the received first pose data and a second pose data quality for the received second pose data, as shown by block 406 of FIG. 4. In some examples, the first pose data quality may be determined to be "good," "marginal," or "bad." In additional examples, the pose data quality may be determined by checking if sensor data is out of range, using Kalman filters, or some other method for determining the quality of the received sensor data.

Method 400 may additionally involve setting the first pose data as vehicle pose data for the autonomous vehicle in response to the first pose data quality being better than or the same as the second pose data quality, as shown by block 408 of FIG. 4. In some examples, the vehicle pose data may be changed to the second pose data when the second pose data quality is better than the first pose data quality. In additional examples, the vehicle computer system may determine a pose data offset between the first pose data and the second pose data. In further examples, the pose data offset may be used to gradually transition the vehicle pose data from the first pose data to the second pose data.

Method 400 may additionally involve controlling, by the vehicle computer system, the autonomous vehicle based on at least the vehicle pose data, as shown by block 410 of FIG. 4. In some examples, the vehicle computer system may control the autonomous vehicle to continue normal operation. In additional examples, the vehicle computer system may control the autonomous vehicle to park safely as soon as possible. In further examples, the vehicle computer system may control the autonomous vehicle to brake and stop immediately.

In some embodiments, method 400 may include more steps than those displayed in FIG. 4. For example, after the vehicle pose data is set as the first pose data (see block 408), the method 400 may also include receiving updated first pose data and updated second pose data. Once received, the method 400 may include updating the first pose data quality and the second pose data quality based on the updated first pose data and the updated second pose data. The method 400 may further include determining the updated second pose data quality is better than the updated first pose data quality. In some examples, the updated second pose data quality may be "good" while the updated first pose data quality is "bad." The method 400 may also include in response to determining that the updated second pose data quality is better than the updated first pose data quality, changing the vehicle pose data from the first pose data to the updated second pose data. In some examples, the vehicle pose data may change from the first pose data to the updated second pose data because the updated second pose data quality is "good" while the updated first pose data quality is "bad."

Figure 5:
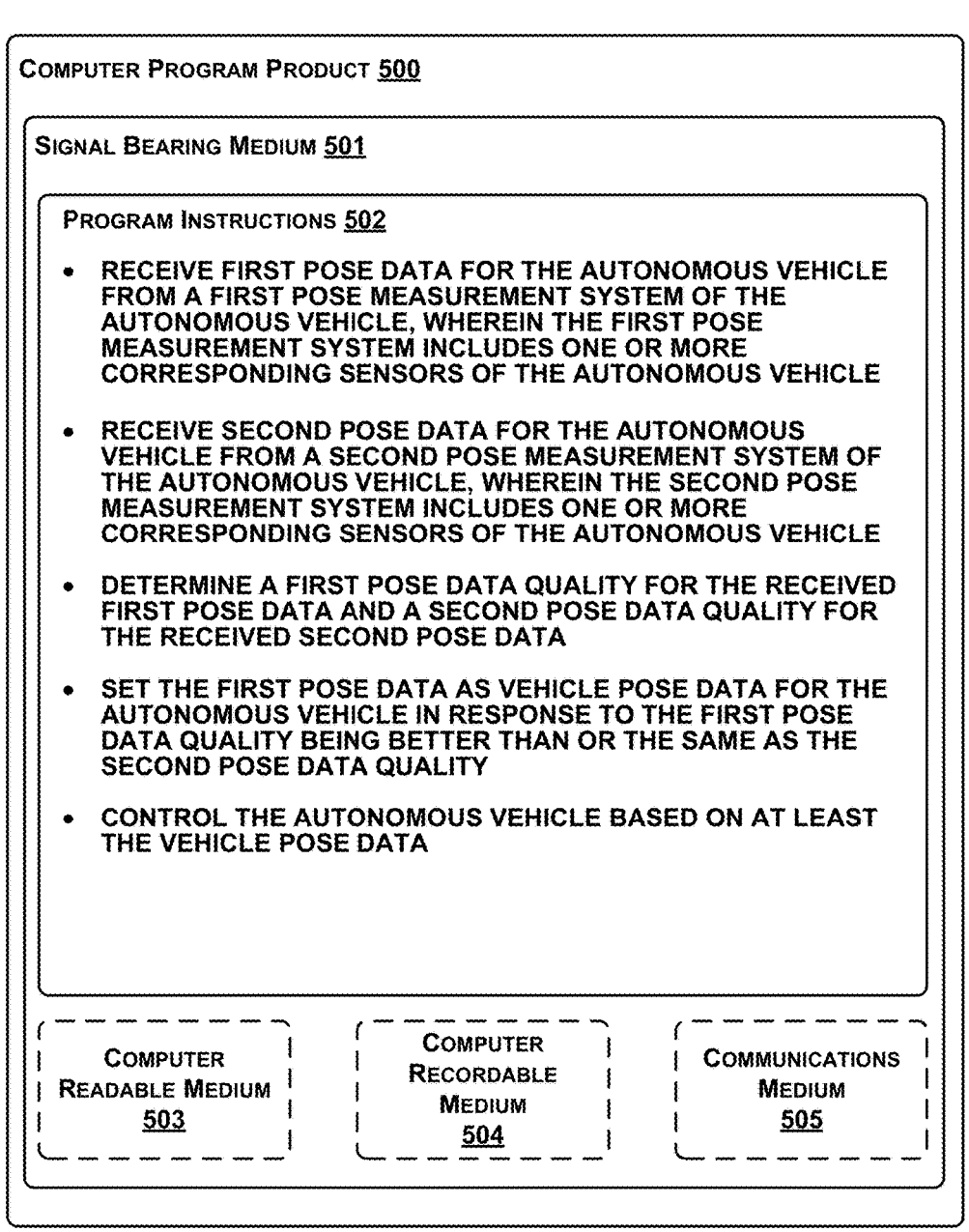
FIG. 5 illustrates an example computer readable medium.

In some embodiments, the disclosed methods may be implemented as computer program instructions encoded on a non-transitory computer-readable storage media in a machine-readable format, or on other non-transitory media or articles of manufacture. FIG. 5 illustrates an example computer readable medium in the form of a computer program product 500 that includes a computer program for executing a computer process on a computing device, arranged for determining vehicle pose data for an autonomous vehicle. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4. Thus, for example, referring to the embodiments shown in FIG. 4, one or more features of blocks 402-410 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4 may be configured to provide various operations, functions, or actions in response to the programming instructions 502 conveyed to the computing device by one or more of the computer readable medium 503, the computer recordable medium 504, and/or the communications medium 505.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining first pose data for an autonomous vehicle based on first sensor data from a first plurality of sensors;
   crosschecking the first sensor data from the first plurality of sensors;
   determining second pose data for the autonomous vehicle based on second sensor data from a second plurality of sensors;
   crosschecking the second sensor data from the second plurality of sensors; and
   controlling, by a vehicle computer system, motion of the autonomous vehicle based on and at least one of the first pose data or the second pose data.

2. The method of claim 1, wherein the first plurality of sensors comprises at least one of an inertial measurement unit (IMU), a wheel speed sensor, or a Global Positioning System (GPS) receiver.

3. The method of claim 1, wherein the second plurality of sensors comprises at least one of an inertial measurement unit (IMU), a wheel speed sensor, or a Global Positioning System (GPS) receiver.

4. The method of claim 1, further comprising:
   determining first pose data quality for the first pose data, wherein the first pose data quality is determined based at least in part on the crosschecking of the first sensor data from the first plurality of sensors; and
   determining second pose data quality for the second pose data, wherein the second pose data quality is determined based at least in part on the crosschecking of the second sensor data from the second plurality of sensors.

5. The method of claim 4, wherein the first pose data and the first pose data quality are determined by a first processor, and wherein the second pose data and the second pose data quality are determined by a second processor, further comprising:
   receiving, by the vehicle computer system, the first pose data and the first pose data quality from the first processor; and
   receiving, by the vehicle computer system, the second pose data and the second pose data quality from the second processor.

6. The method of claim 4, wherein controlling motion of the autonomous vehicle based on at least one of the first pose data or the second pose data comprises:
   comparing the first pose data quality and the second pose data quality;
   controlling the autonomous vehicle based on the first pose data if the first pose data quality is higher than the second pose data quality; and
   controlling the autonomous vehicle based on the second pose data if the second pose data quality is higher than the first pose data quality.

7. The method of claim 4, wherein controlling motion of the autonomous vehicle based on at least one of the first pose data or the second pose data comprises:
   determining whether either of the first pose data quality or the second pose data quality is at a predetermined high level;
   controlling the autonomous vehicle normally if at least one of the first pose data quality or the second pose data quality is at the predetermined high level; and
   controlling the autonomous vehicle to perform an emergency maneuver if neither the first pose data quality nor the second pose data quality is at the predetermined high level.

8. The method of claim 7, wherein controlling the autonomous vehicle to perform the emergency maneuver comprises controlling the autonomous vehicle to pull over and park.

9. The method of claim 7, wherein controlling the autonomous vehicle to perform the emergency maneuver comprises controlling the autonomous vehicle to stop immediately.

10. A system, comprising:
    a first pose measurement system for an autonomous vehicle, comprising:
       a first plurality of sensors; and
       a first processor, wherein the first processor is configured to determine first pose data for the autonomous vehicle based on first sensor data from the first plurality of sensors and crosscheck the first sensor data from the first plurality of sensors;
    a second pose measurement system for an autonomous vehicle, comprising:
       a second plurality of sensors; and
       a second processor, wherein the second processor is configured to determine second pose data for the autonomous vehicle based on second sensor data from the second plurality of sensors and crosscheck the second sensor data from the second plurality of sensors; and
    a vehicle control system comprising a vehicle-control processor and a memory storing instructions executable by the vehicle-control processor to perform functions comprising:
       receiving the first pose data from the first pose measurement system;
       receiving the second pose data from the second pose measurement system; and
       controlling motion of the autonomous vehicle based on at least one of the first pose data or the second pose data.

11. The system of claim 10, wherein the first plurality of sensors comprises at least one of an inertial measurement unit (IMU), a wheel speed sensor, or a Global Positioning System (GPS) receiver, and wherein the second plurality of sensors comprises at least one of an IMU, a wheel speed sensor, or a GPS receiver.

12. The system of claim 10, wherein the functions further comprise:
    determining first pose data quality for the first pose data, wherein the first pose data quality is determined based at least in part on crosschecking the first pose data from the first plurality of sensors; and
    determining second pose data quality for the second pose data, wherein the second pose data quality is determined based at least in part on crosschecking the second pose data from the second plurality of sensors.

13. The system of claim 12, wherein controlling motion of the autonomous vehicle based on at least one of the first pose data or the second pose data comprises:
- comparing the first pose data quality and the second pose data quality;
- controlling the autonomous vehicle based on the first pose data if the first pose data quality is higher than the second pose data quality; and
- controlling the autonomous vehicle based on the second pose data if the second pose data quality is higher than the first pose data quality.

14. The system of claim 12, wherein controlling motion of the autonomous vehicle based on at least one of the first pose data or the second pose data comprises:
- determining whether either of the first pose data quality or the second pose data quality is at a predetermined high level;
- controlling the autonomous vehicle normally if at least one of the first pose data quality or the second pose data quality is at the predetermined high level; and
- controlling the autonomous vehicle to perform an emergency maneuver if neither the first pose data quality nor the second pose data quality is at the predetermined high level.

15. The system of claim 14, wherein controlling the autonomous vehicle to perform the emergency maneuver comprises controlling the autonomous vehicle to pull over and park.

16. The system of claim 14, wherein controlling the autonomous vehicle to perform the emergency maneuver comprises controlling the autonomous vehicle to stop immediately.

17. A non-transitory computer-readable medium storing instructions that are executable by one or more computing devices, wherein executing the instructions causes the one or more computing devices to perform functions comprising:
- determining first pose data for an autonomous vehicle based on first sensor data from a first plurality of sensors;
- crosschecking the first sensor data from the first plurality of sensors;
- determining second pose data for the autonomous vehicle based on second sensor data from a second plurality of sensors;
- crosschecking the second sensor data from the second plurality of sensors; and
- controlling motion of the autonomous vehicle based on at least one of the first pose data or the second pose data.

18. The non-transitory computer readable medium of claim 17, wherein the functions further comprise:
- determining first pose data quality for the first pose data, wherein the first pose data quality is determined based at least in part on the crosschecking of the first sensor data from the first plurality of sensors; and
- determining second pose data quality for the second pose data, wherein the second pose data quality is determined based at least in part on the crosschecking of the second sensor data from the second plurality of sensors.

19. The non-transitory computer readable medium of claim 18, wherein controlling motion of the autonomous vehicle based on at least one of the first pose data or the second pose data comprises:
- comparing the first pose data quality and the second pose data quality;
- controlling the autonomous vehicle based on the first pose data if the first pose data quality is higher than the second pose data quality; and
- controlling the autonomous vehicle based on the second pose data if the second pose data quality is higher than the first pose data quality.

20. The non-transitory computer readable medium of claim 18, wherein controlling motion of the autonomous vehicle based on at least one of the first pose data or the second pose data comprises:
- determining whether either of the first pose data quality or the second pose data quality is at a predetermined high level;
- controlling the autonomous vehicle normally if at least one of the first pose data quality or the second pose data quality is at the predetermined high level; and
- controlling the autonomous vehicle to perform an emergency maneuver if neither the first pose data quality nor the second pose data quality is at the predetermined high level.

* * * * *